(12) United States Patent
Ruskin

(10) Patent No.: US 7,445,168 B2
(45) Date of Patent: Nov. 4, 2008

(54) ANTI-SYPHON EMITTER

(75) Inventor: Rodney Ruskin, San Francisco, CA (US)

(73) Assignee: A.I. Innovations, N.V., San Rafael, CA (US)

( * ) Notice: Subject to any disclaimer, the term of this patent is extended or adjusted under 35 U.S.C. 154(b) by 0 days.

(21) Appl. No.: 11/418,745

(22) Filed: May 4, 2006

(65) Prior Publication Data

US 2006/0255186 A1  Nov. 16, 2006

Related U.S. Application Data

(60) Provisional application No. 60/677,520, filed on May 4, 2005.

(51) Int. Cl.
*B05B 15/00* (2006.01)

(52) U.S. Cl. .................. 239/542; 239/547; 239/570; 239/601

(58) Field of Classification Search ............. 239/542, 239/547, 570, 597–599, 601
See application file for complete search history.

(56) References Cited

U.S. PATENT DOCUMENTS

| | | | |
|---|---|---|---|
| 3,882,892 A * | 5/1975 | Menzel | 137/513.3 |
| 3,912,165 A | 10/1975 | Pira | |
| 4,011,893 A * | 3/1977 | Bentley | 138/43 |
| 4,105,162 A * | 8/1978 | Drori | 239/109 |
| 4,209,133 A | 6/1980 | Mehoudar | |
| 5,294,058 A * | 3/1994 | Einav | 239/533.1 |
| 5,413,282 A * | 5/1995 | Boswell | 239/542 |
| 5,829,686 A | 11/1998 | Cohen | |
| 6,085,986 A * | 7/2000 | Yu | 239/1 |
| 6,206,305 B1 | 3/2001 | Mehoudar | |
| 6,302,338 B1 * | 10/2001 | Cohen | 239/542 |

FOREIGN PATENT DOCUMENTS

WO  WO 9007267  7/1990

OTHER PUBLICATIONS

International Search Report and Written Opinion; PCT; Sep. 25, 2006.

* cited by examiner

*Primary Examiner*—Dinh Q Nguyen
(74) *Attorney, Agent, or Firm*—Christie, Parker & Hale, LLP

(57) ABSTRACT

A drip irrigation emitter includes a housing containing an inlet opening for receiving water from a supply tube and an outlet opening for emitting water at a pressureless drip rate. A labyrinth inside the emitter receives water from the supply tube through the inlet opening, reducing its pressure and emitting the water at a drip rate. A flexible pressure-compensating diaphragm inside the housing flexes elastically under pressure changes of water entering in the opening from the supply tube. A raised structured surface positioned between the inlet opening and the diaphragm prevents the diaphragm from sealing off water entry to the emitter housing through the inlet opening when water pressure in the supply tube is shut off. The raised structured surface is configured to allow air contained in the soil to be drawn backwards through the emitter at a very slow rate, thereby inhibiting emitter blockage caused by soil ingestion.

7 Claims, 2 Drawing Sheets

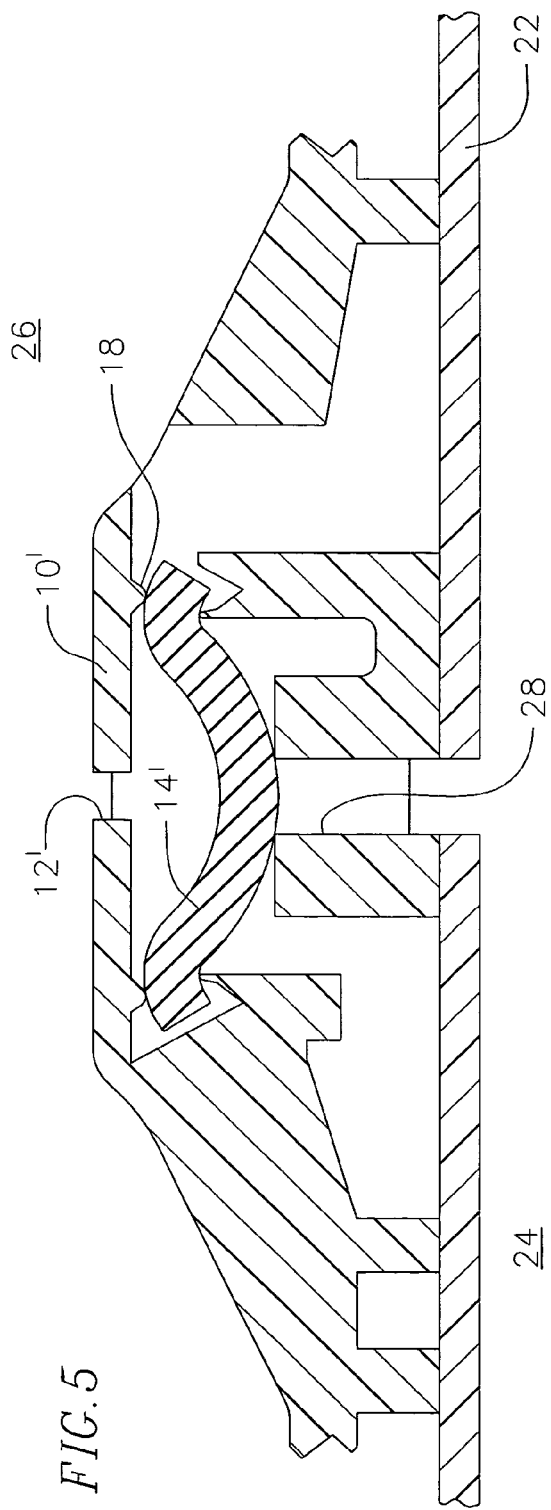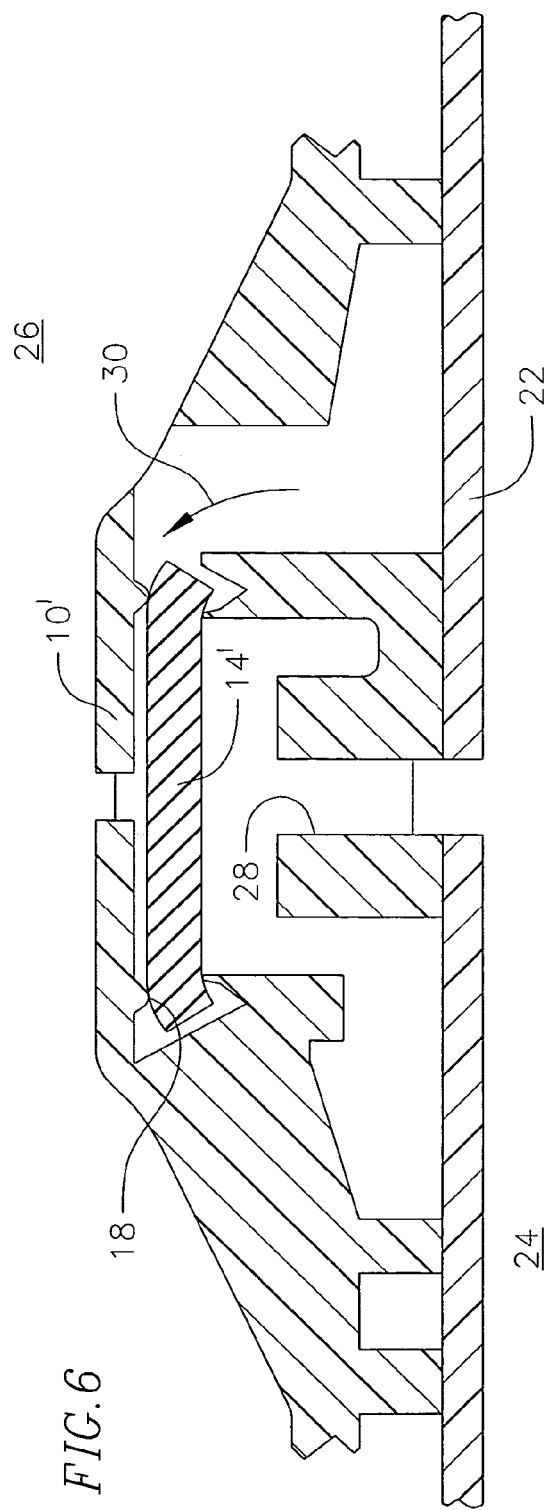

ANTI-SYPHON EMITTER

CROSS-REFERENCE

This application claims priority to U.S. Provisional Application 60/677,520, filed May 4, 2005, the entire disclosure of which is incorporated herein by this reference.

FIELD OF THE INVENTION

This invention relates to drip irrigation emitter units, and more particularly, to an anti-syphon emitter that allows air to be drawn backwards through the emitter at a very slow rate, thereby inhibiting flow of soil or soil and water into the emitter.

BACKGROUND

When drip irrigation systems are buried underground, problems can arise when the water pressure is shut off. There are two scenarios: Most drip irrigation emitters will allow the water in the tube to run out into the soil when the water pressure is off. This results in a vacuum in the tube, causing soil to be sucked back into another emitter, thereby plugging the second emitter. To avoid this risk, almost all buried drip systems are fitted with vacuum relief valves. When the slope is monotonic this is a comparatively simple matter, albeit, not costless. However, if the slope is undulating or complex, then the positioning of vacuum relief valves can be both difficult and expensive. In special conditions, such as on golf courses, especially putting greens, the presence of vacuum relief valves may be unacceptable.

Some drip irrigation valves are designed in such a manner that the valve shuts off when the water pressure is off, thereby sealing the water in the tube until the next operating cycle. The problem with this type of emitter is that if the water contains any biological matter, bacteria may multiply and form slimes that will block the emitter on the next cycle.

My invention solves these problems. Experimental tests of my invention demonstrate that the anti-syphon emitter causes the supply tube to empty slowly when water pressure is shut off, thereby inhibiting undesired build up of vacuum pressure in the tube. The anti-syphon emitter also avoids the bacteria problems caused by maintaining water sealed inside the tube when the valve shuts off.

There are many pressure compensating emitters on the market. These include a rubber diaphragm which moves forward under pressure to seal against a rim to provide a controlled flow. Mehoudar U.S. Pat. No. 4,209,133 describes such an emitter. Another such emitter is described in Mehoudar U.S. Pat. No. 6,206,305. Mehoudar U.S. Pat. No. 4,209,133 is an emitter of the first type above. Mehoudar U.S. Pat. No. 6,206,305 is adaptable to be of the second type. The disclosures of the '133 and '305 patents are incorporated herein by reference.

SUMMARY OF THE INVENTION

According to my invention, the emitter has a housing for the rubber diaphragm which is configured so that when the water pressure is off the diaphragm lies loosely against the water entry, but without sealing the water entry to the emitter housing. Under vacuum from the inside of the tube, the diaphragm then seals the water entry. A small slit or hole in the seal allows the air in the soil to very slowly enter the emitter, thereby allowing the water in the tube to slowly drain.

These and other aspects of the invention will be more fully understood by referring to the following detailed description and the accompanying drawings.

BRIEF DESCRIPTION OF THE DRAWINGS

FIG. 5 illustrates a cross-sectional view of the emitter under normal pressure compensating conditions.

FIG. 6 illustrates a cross-sectional view of the same emitter under slow leak conditions.

DETAILED DESCRIPTION

This invention provides a pressure-compensating emitter useful in drip irrigation applications. The invention is particularly useful in waste water disposal or in handling agricultural water supplies. The emitter of this invention is secured to a long supply tube in the well known manner, either to the inside or on the outside of the tube. Water entering the emitter from inside the supply tube passes through a labyrinth contained in the emitter and passes to the outside at a controlled slow pressureless drip rate. Such emitters can be the pressure-compensating type in which a flexible rubber diaphragm regulates pressure to within controlled limits, adjusting to variations in the supply line pressure.

Figure 1:
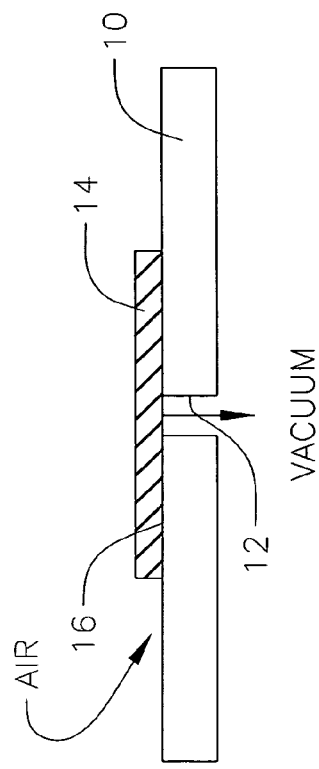
FIGS. 1 and 2 schematically illustrate one embodiment of an emitter having a slow leak function provided by a roughened surface.
Figure 2:
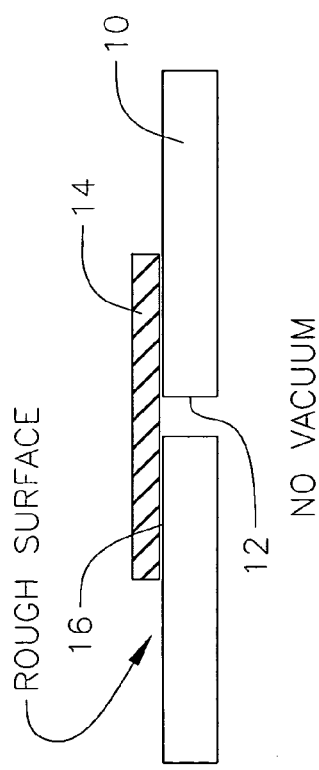

FIGS. 1 and 2 briefly illustrate one embodiment of the invention in which an emitter housing includes an emitter body 10 having an inlet opening 12 that faces the inside of a supply line or tube (not shown). The housing includes a pressure-compensating diaphragm 14 that contacts the body of the dripper. The diaphragm controls flow of water through the inlet opening from the supply tube to the inside of the emitter housing where the water passes through a labyrinth (not shown) and then to the outside of the emitter. The area of surface contact between the diaphragm and the body of the emitter surrounding the inlet opening has a structured surface which, in one embodiment, is a roughened surface 16 that causes the rubber diaphragm to loosely contact the roughened surface area and thereby lie loosely against water entry but without sealing the water entry. However, as illustrated in FIG. 2, the roughed surface allows air to seep through it from the soil to very slowly enter the emitter which then allows the water in the supply tube to slowly drain. In one embodiment, the roughened surface can be produced by any type of roughening such as sand blasting for example, or other molded contour that would produce the small bypass spaces between the body of the emitter and the diaphragm.

Figure 3:
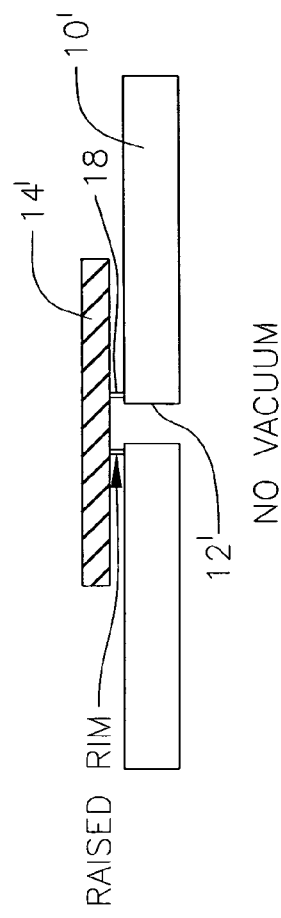
FIGS. 3 and 4 schematically illustrate an alternate embodiment of an emitter having a raised rim with a small passageway that produces the slow leak function.
Figure 4:
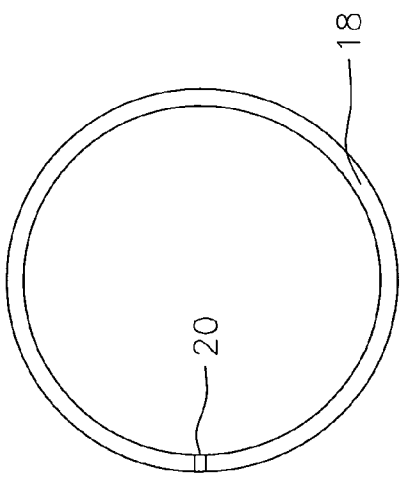

FIGS. 3 and 4 illustrate an alternative embodiment of the invention in which the drip emitter, similar to FIGS. 1 and 2, includes a drip emitter housing 10', having the water inlet opening 12' controlled by the pressure-compensating diaphragm 14'. In this embodiment, a raised rim 18 is positioned between the diaphragm and the body of the emitter in the area surrounding the opening positioned between the diaphragm and the body of the emitter in the area surrounding the opening 12'. This embodiment is an alternative to the embodiment of FIGS. 1 and 2, but also provides the same technique of producing a poor seal between the diaphragm and the opening via the raised rim 18. The rim includes along its outer periphery a small slit or hole 20, shown in FIG. 3, which acts as a choke against air flow, which allows air to be drawn back slowly from the soil under vacuum and through the emitter thereby reducing blockage caused by soil ingestion.

FIGS. 5 and 6 illustrate a more detailed embodiment of the invention which includes the raised rim. FIG. 5 illustrates the emitter during normal operation in which the emitter is affixed to a supply tube 22. The soil side of the tube is shown at 24 and the inside of the tube is at 26. During normal regulating conditions, the flexible diaphragm 14' flexes under pressure from water passing through the inlet opening 12' to move toward the outlet opening 28 of the emitter for controlling the drip rate flow through that opening.

FIG. 6 illustrates the same configuration in which the raised rim 18 is positioned between the emitter 10' and the diaphragm 14'. In this instance the diaphragm is held in position by the circular rim 18. The hole in the rim allows air passing from the soil to move slowly in the direction of the arrow 30 in FIG. 6 which can break the vacuum in the supply tube and can slowly force water out of the drippers.

The invention provides a slowly controlled vacuum relief function. The advantages of the present invention can be understood best by considering a situation in which a supply line having a series of drip emitters passes from a higher elevation to a lower elevation. In these situations vacuum relief may not be entirely effective. When water pressure is shut off in a conventional system, the diaphragm in each pressure-compensating dripper reacts quickly, moving back to the position of FIG. 6, causing water in the drippers to flow out immediately at a fast rate. The top drippers in the drip line are subjected to a rapidly formed vacuum which sucks in on the drippers and can cause soil to pass into the dripper, causing clogging, in the upper levels of the drip line.

When there is no vacuum relief, and with the system of the present invention, air only comes in slowly and the water level in the supply tube drops slowly. The vacuum holds up the water in the supply tube and releases it slowly allowing air to be sucked into the top drippers slowly. Since air suction is slow, and no soil is drawn into emitters. If there is vacuum relief, water will drop more rapidly.

In an alternative situation the invention avoids bacterial build up problems caused by shutting off a drip line for keeping the supply line fully sealed. In this instance bacteria can grow rapidly in waste water effluent or agricultural water. With the present invention air is drawn in slowly to the top drippers in the line, while water drains out slowly at the bottom. The air being drawn in slowly breaks the vacuum in the supply tube; and the air can slowly cause the water in the supply line to empty out at a slow controlled rate, avoiding the build up of bacteria caused by a sealed supply line.

The present invention works with or without vacuum relief valves.

EXAMPLE

An experimental subsurface drip irrigation (SDI) effluent disposal system according to this invention was installed, operated and monitored. The principal purpose of the trial was to quantify the environmental hydraulic performance of a high rate SDI effluent disposal application utilizing tertiary treated municipal effluent to a land disposal site comprising volcanic soils within a forest situation, which involved very severe terrain and a significantly hilly and undulating topography.

The bulk of the trial utilized standard 16 mm OD 2 L/hr PC Wasteflow, which was laid out conventionally across the contour. (Wasteflow is a product of Geoflow, Inc.) One separate and distinct portion of the project included three buried lines with the anti-syphon drip emitter of this invention (Anti-syphon emitters herein). The emitters/pipe were 18 mm OD 2 L/hr PC and did not include bactericide-lined tube. The Anti-syphon emitters included Rootguard (Rootguard is a product of Geoflow, Inc.). There were two flow meters within the trial, one recording just the Anti-syphon performance, the other the Wasteflow.

The Anti-syphon tubes were each approximately eighty meters long. These tubes were connected to a pressure submain with a conventional layout including a VBK vacuum relief valve. There was also a VBK vacuum relief valve directly downstream of the filter (to break any dynamic vacuum) which because of the system configuration is the point of valve closure for an irrigation cycle (via a pressure sustaining valve closing on low pressure).

Each tube then RISES almost one meter over a forty meter distance to a high point, then FALLS from that high point fifteen meters over a further forty meter distance to a low point including a short flush submain. The flush submain included a 32 mm plug (which can be removed) and manual valve in order that a hose can be connected to this point and any flush material collected and/or observed.

In general, the system operated in the order of 7.5 hours per day via fifteen half hour cycles, each being separated by a corresponding half hour rest period.

The system received no maintenance from the date it commenced full operation over a period of more than eleven months.

During operation three individual drip emitters were removed from two Anti-syphon tubes (six emitters in total) at the high point, or the fifteen meter fall side of the high point, for evaluation. These emitters were tested, found to have a decline in expected performance, then run with a chlorine solution and left over night. The following day these emitters were turned on to full pressure then off to full drain, then on again three times to flush out any debris from chlorination. The drip emitters were then retested, with results being presented in Table 1:

TABLE 1

| | Anti-syphon Drip Emitter Tests | |
|---|---|---|
| Emitter | Pre Chlorine (L/hr) | Post Chlorine (L/hr) |
| 1 | 1.50 | 2.00 |
| 2 | 2.20 | 2.50 |
| 3 | 1.75 | 1.90 |
| 4 | 1.50 | 1.70 |
| 5 | 2.00 | 2.00 |
| 6 | 1.40 | 1.50 |
| Average | 1.73 | 1.93 |

Bacterial slime growth was identified to have built up on the pressure side (side facing the middle of the drip tube) of the diaphragm immediately below the modified and welded closed "gates." Once cut open, internally the drip emitters appeared relatively clean. It was concluded that any Anti-syphon drip emitters to be used in specified wastewater disposal projects (even incorporating tertiary standard effluent) will need to include ULTRA-FRESH anti-microbial and ROOTGUARD impregnation, (both products of Geoflow, Inc.).

Six replacement Anti-syphon drip emitters were then installed in the trial system and the system operated without further maintenance.

At the end of the trial both the Wasteflow and the Anti-syphon tubes were given a high velocity scour in the order of one foot/second velocity with the flush material being collected into a 50 Liter bucket, observed, discarded and then refilled continually. A surprising and very noticeable difference existed between the bactericide-lined Wasteflow and the non-bactericide lined Anti-syphon tubes, despite the fact that the effluent source is a very visually clean (typically 13 ppm TSS, 13 ppm $BOD_5$) UV disinfected tertiary source.

There was only in the order of 240 meters of Anti-syphon tube, with the main trial including approximately 1,500 meters of Wasteflow. The Wasteflow trial was divided into two halves for flushing purposes. The Wasteflow lines flushed black for approximately 20 seconds out of each flush submain, then were perfectly clear within ten minutes, after a proportional clearing of bacterial material over this period. The Anti-syphon ran full black for about 30 seconds, ran very dirty with black bacterial material the size of three match heads for ten minutes and still after a further five minutes fifteen minutes in total) was still heavily laden with bacterial material the size of one match head. No inorganic solid was recovered, suggesting the Anti-syphon was working. The very noticeable difference in bacterial loading was attributed to the bactericide lining working very effectively.

Once scoured both the Wasteflow and Anti-syphon tubes received a chlorine injection and were left overnight to clean.

The next day, each flush submain in turn was scoured and observed. The Wasteflow produced 20 L of bleached white heavy dead biological material, then ran very clean with occasional biological floc. The Anti-syphon tube ran chocolate dark brown for thirty seconds and then continued to produce dark floc of a heavier load than the Wasteflow for a further ten minutes. All blocks were scoured for approximately thirty minutes with the Anti-syphon never really running perfectly clear.

On the same day, and once scoured, both the Wasteflow and Anti-syphon tubes received a second chlorine injection and were left overnight to clean.

On the following day, each flush submain in turn was scoured again and observed. Each submain produced dirty material for about thirty seconds, but was flushed for about an hour during which time black biological material up to ten mm across were occasionally sloughed off (ex the MDPE main and submains. Again the Anti-syphon was noticeably the most dirty and ran full black for the first thirty seconds.

The project incorporated a new form of telemetry for data recording and downloading (via GPRS cellular) and to present the flow meter readings in either a readily legible format, or to describe the actual flow readings, in a timely manner was is not a trivial exercise. However, the literal readings (in pulses per 3 minutes) gave a relative comparison of actual performance of both the Anti-syphon and Wasteflow over the test period and are presented in Table 2:

TABLE 2

Comparative Flow Meter Results
(Electronic Pulses/three minutes)

| Date | Project Status | Wasteflow | Anti-syphon |
|---|---|---|---|
| Start date | Pre-Cleaning | 21 | 17 |
| Ten months later | | 7 | 10 |
| % of Original Flow | Post-Cleaning | 33% | 59% |
| 11 months later | | 21 | 17 |
| % of Original Flow | | 100% | 100% |

Note that the Wasteflow has a 50 mm flow meter and the Anti-syphon a 25 mm, so there is no correlation in actual flows between the two trials. But the relative blockage over time for each trial is considered comparative.

CONCLUSIONS (1) Even with a high quality tertiary treated effluent source, blockage via bacterial slime build-up is a potentially significant threat.

(2) From visual observations of the flush material, there is a significant advantage to having the anti-microbial lining of the Wasteflow as compared to not including this technology, in terms of internal pipe bacterial material flushed to waste during cleaning.

(3) From the visual observations of the flush material and the flow meter readings, the Anti-syphon feature appears in the first instance to mitigate blockage via particulate ingress into the emitters due to suck back on system shut down.

(4) From visual observations of cut open Anti-syphon emitters, Ultra-Fresh anti-microbial addition should be included for certain specified wastewater projects.

(5) Based upon the flow meter readings, it appears that the Anti-syphon emitters have blocked almost half as much as the standard PC emitter over time, yet both have been able to be cleaned to full original flow rate.

(6) The 18 mm PC Anti-syphon trial emitter appears to have significant technical advantages in terms of blockage resistance from both system suck back and bacterial slime build-up through operation with wastewater.

What is claimed is:

1. A drip irrigation emitter having a housing containing an inlet opening for receiving water from a supply tube and an outlet opening for emitting water at a pressureless drip rate; a labyrinth between the inlet opening and the outlet opening for receiving water from the supply tube through the inlet opening and reducing its pressure for emitting the water at said drip rate from the outlet opening of the housing; a flexible pressure-compensating diaphragm inside the housing, the diaphragm disposed in the housing to flex elastically under pressure changes of water entering in the inlet opening from the supply tube to control the flow of water from the outlet opening; and a raised structured surface positioned between the inlet opening and the diaphragm, the raised structured surface comprising a raised rim surrounding the inlet opening and positioned for contact with the diaphragm when water pressure in the supply tube is shut off, the raised rim having a small slit or hole therein to provide a bypass path through the structured surface to act as a choke against air flow, allowing air to be drawn back slowly through the emitter thereby reducing blockage at the outlet opening caused by soil ingestion.

2. Apparatus according to claim 1 in which the raised rim is configured to respond to a vacuum build up inside the supply tube to maintain a seal to the diaphragm around the inlet opening while the small slit or hole in the rim provides the bypass path through the structured surface.

3. Apparatus according to claim 1 in which the gap through the raised rim is substantially less in area than the inlet opening or the outlet opening of the emitter.

4. A drip irrigation system comprising an elongated supply tube and a plurality of emitters according to claim 1 affixed to the supply tube.

5. A drip irrigation emitter having a housing containing an inlet opening for receiving water from the supply tube and an outlet opening for emitting water at a pressureless drip rate to the exterior of the supply tube; a labyrinth between the inlet opening and the outlet opening for receiving water from the supply tube through the inlet opening and reducing its pressure for emitting the water at said drip rate from the outlet opening of the housing; a raised rim surrounding the inlet opening in the emitter; and a flexible pressure compensating diaphragm disposed in the housing to flex elastically under pressure changes in water entering the inlet opening from the supply tube for controlling the flow of water from the outlet opening, the raised rim having a small slit or hole therein to provide a bypass path through the rim to act as a choke against air flow when water pressure in the supply tube is shut off, allowing air to be drawn back slowly through the emitter thereby reducing blockage caused by soil ingestion.

6. Apparatus according to claim 5 in which the raised rim is configured to respond to a vacuum build up inside the supply tube to maintain a seal to the diaphragm around the inlet opening while the small slit or hole in the rim provides the bypass path.

7. A drip irrigation system comprising an elongated supply tube and a plurality of emitters according to claim 5 affixed to the supply tube.

* * * * *